(12) United States Patent
Kuroda et al.

(10) Patent No.: US 10,893,159 B2
(45) Date of Patent: Jan. 12, 2021

(54) DOCUMENT FEEDER AND IMAGE FORMING APPARATUS

(71) Applicant: SHARP KABUSHIKI KAISHA, Sakai (JP)

(72) Inventors: Kenji Kuroda, Sakai (JP); Shohichi Fukutome, Sakai (JP); Hironori Ogasawara, Sakai (JP); Hisashi Yamanaka, Sakai (JP); Toshiki Fukunishi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/653,572

(22) Filed: Oct. 15, 2019

(65) Prior Publication Data

US 2020/0128138 A1 Apr. 23, 2020

(30) Foreign Application Priority Data

Oct. 18, 2018 (JP) ................................. 2018-196941

(51) Int. Cl.
*H04N 1/00* (2006.01)

(52) U.S. Cl.
CPC ....... *H04N 1/0049* (2013.01); *H04N 1/00636* (2013.01); *H04N 2201/0094* (2013.01)

(58) Field of Classification Search
CPC .......... H04N 2201/02462; H04N 2201/02474; H04N 2201/02485; H04N 1/02815; H04N 1/02885; H04N 1/02825; H04N 1/02835; H04N 2201/0094; H04N 1/4097; H04N 1/193; H04N 1/3872; H04N 1/3878; H04N 1/62; H04N 2201/0446; H04N 1/00408; H04N 1/00519; H04N 1/00543; H04N 1/00665; H04N 1/02855; H04N 1/02865; H04N 1/03; H04N 1/123; H04N 1/2032; H04N 2201/0081; H04N 2201/0082; H04N 2201/0442; H04N 1/1215; F21V 29/505; F21V 29/70; F21V 29/89; G02B 6/0001; G02B 6/0055; G02B 6/0085; G03B 27/54; G03G 15/04036; G03G 15/0435; G03G 15/326; G03G 15/0131; G03G 15/1605; G03G 15/5058; G03G 21/1633;

(Continued)

(56) References Cited

U.S. PATENT DOCUMENTS 7,548,352 B2 * 6/2009 Sakurai .............. H04N 1/02815
 250/552
2006/0061830 A1 * 3/2006 Sakakibara .......... H04N 1/4097
 358/448

(Continued)

FOREIGN PATENT DOCUMENTS

JP 2013-197725 A 9/2013

*Primary Examiner* — Negussie Worku
(74) *Attorney, Agent, or Firm* — ScienBiziP, P.C.

(57) ABSTRACT

A document feeder includes an input tray (part of a document placing portion) on which a document is placed, an output tray on which the document output from a document output port in an output direction is stacked, and a substrate including a light source that emits light to the output tray. The output tray is disposed below the input tray. The substrate is fixed to the document placing portion at an oblique angle relative to a horizontal reference of the document feeder such that the optical axis of the light source extends toward the document output port.

9 Claims, 9 Drawing Sheets

(58) Field of Classification Search
CPC ... G03G 2215/00059; G03G 2215/0119; B41J 15/04; B41J 15/042; B41J 29/02; B41J 29/13; B65H 5/26; B65H 7/20
USPC .................................................. 358/498, 474
See application file for complete search history.

(56) References Cited

U.S. PATENT DOCUMENTS

| | | | |
|---|---|---|---|
| 2011/0063644 A1* | 3/2011 | Niihara | B41J 15/04 358/1.12 |
| 2011/0164413 A1* | 7/2011 | Yamada | G02B 6/0001 362/217.05 |
| 2013/0141766 A1* | 6/2013 | Iwamatsu | H04N 1/03 358/475 |
| 2013/0242356 A1 | 9/2013 | Oshida | |
| 2015/0222777 A1* | 8/2015 | Enomoto | H04N 1/193 358/496 |
| 2020/0088649 A1* | 3/2020 | Jeang | G01N 21/636 |
| 2020/0241289 A1* | 7/2020 | Morinaga | G02B 26/101 |

* cited by examiner

DOCUMENT FEEDER AND IMAGE FORMING APPARATUS

BACKGROUND OF THE INVENTION

Field of the Invention

The present invention relates to a document feeder that transports a document and an image forming apparatus.

Description of the Background Art

A known document feeder disposed in an image forming apparatus takes in a document placed on an input tray, and outputs the document on an output tray after the document is read. In the document feeder, the input tray is disposed above the output tray. Consequently, the output tray is dark, and sometimes the user fails to notice documents output on the dark output tray. A light source that emits light to the output tray has been proposed to prevent such a document to be left unnoticed (for example, Japanese Unexamined Patent Publication No. 2013-197725).

The image reader according to Japanese Unexamined Patent Publication No. 2013-197725 includes a document placing portion that holds documents; a document transporter that transports a document placed on the document placing portion; a document discharge portion that is disposed directly below the document placing portion, and receives a document output by the document transporter; and an illuminating unit (illuminating lamp) that is disposed below the document placing portion, and emits light onto the document discharge portion. The illuminating unit is disposed orthogonal to the document transport direction and in an area outside the document path for a document having the maximum size. In the above-described image reader, the illuminating lamp is simply disposed on the lower face of the document placing portion, and the irradiation range in the document transport direction is not taken into consideration. Thus, the visibility of the document discharge portion is not satisfactory.

An object of the present invention, which has been conceived to solve the issue described above, is to provide a document feeder and an image forming apparatus that can increase the range illuminated with light in the output direction, and provide the user with a better view.

SUMMARY OF THE INVENTION

A document feeder according to at least an embodiment of the present invention includes an document placing portion on which a document is placed; a document discharge portion on which the document output from a document output portion an output direction is stacked; and a substrate including a light source that emits light to the document discharge portion, the document discharge portion being disposed below the document placing portion, the substrate being fixed to the document placing portion such that an optical axis of the light source extends toward the document output port and tilts relative to a horizontal reference of the document feeder.

In the document feeder according to at least an embodiment of the present invention, the optical axis of the light source may tilt in the output direction relative to an upper face of the document discharge portion.

In the document feeder according to at least an embodiment of the present invention, the optical axis of the light source may tilt in the output direction relative to a placing face of the document placing portion.

In the document feeder according to at least an embodiment of the present invention, the substrate may be disposed on a downstream edge of the document placing portion in the output direction.

In the document feeder according to at least an embodiment of the present invention, the irradiation range of light emitted from the light source may include an area out of a downstream edge of the document discharge portion in the output direction.

In the document feeder according to at least an embodiment of the present invention, the document discharge portion may extend in the output direction to an area downstream of the irradiation range of the light emitted from the light source.

In the document feeder according to at least an embodiment of the present invention, the substrate may be incorporated in the document placing portion and allows emission of light through an opening portion, and the opening portion may be disposed on a lower face of the document placing portion, and includes a slit member that restricts light emitted from the light source.

In the document feeder according to at least an embodiment of the present invention, the optical axis of the light source may tilt toward a front side of the document feeder in a width direction of the document output from the document output port.

The document feeder according to at least an embodiment of the present invention may include an optical member that varies the direction of light emitted from the light source, so as to tilt the optical axis.

An image forming apparatus according to at least an embodiment of the present invention includes the document feeder according to the present invention.

According to at least an embodiment of the present invention, a substrate is obliquely disposed to increase an irradiation range in the output direction, thereby providing the user with a better view.

DESCRIPTION OF THE PREFERRED EMBODIMENTS

First Embodiment

An image forming apparatus according to a first embodiments of the present invention will now be described with reference to the accompanying drawings.

Figure 1:
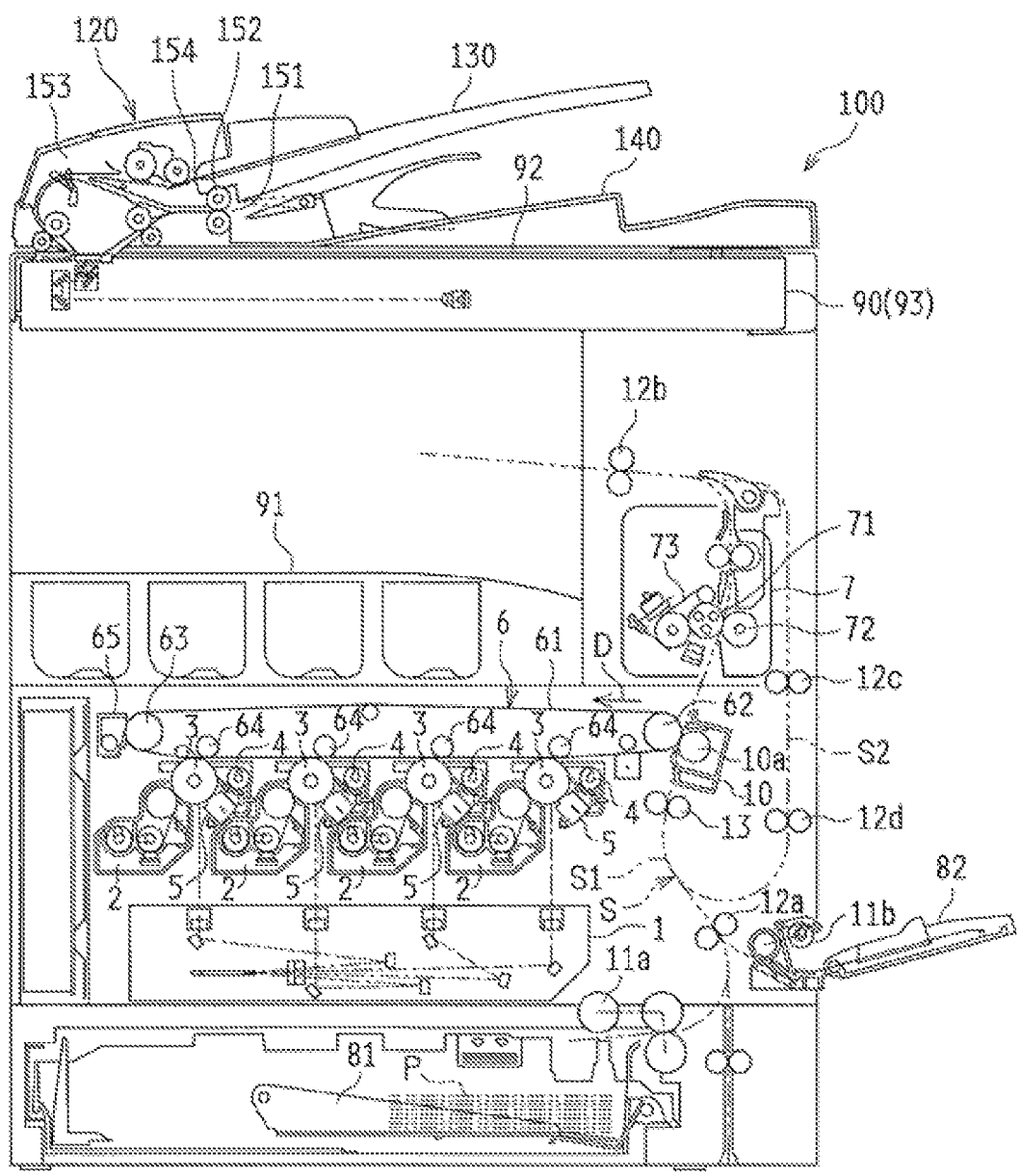
FIG. 1 is a schematic side view of an image forming apparatus according to a first embodiment of the present invention.

FIG. 1 is a schematic side view of an image forming apparatus 100 according to the first embodiment of the present invention.

The image forming apparatus 100 is a multifunction peripheral functioning as a scanner, a copier, a printer, a facsimile machine, etc. The image forming apparatus 100 sends an image of a document read by an image reader 90 to an external device (i.e., functions as a scanner), and forms a multicolor or monochrome image of the read document or an image received from an external device on a sheet (i.e., functions as a copier, a printer, and a facsimile machine).

The image reader 90 supports a document feeder 120 or automatic document feeder (ADF) so as to allow the document feeder 120 to be freely opened and closed. The image reader 90 includes an image reading unit 93 including a light source or an image sensor elements, and reads an image of a document. When the document feeder 120 is opened, a document table 92 in the upper side of the image reader 90 is exposed to allow a document (sheet) to be manually placed on the document table 92. The document feeder 120 automatically transports a placed document to the image reader 90. The image reader 90 reads the placed document or the document transported by the document feeder 120, and generates image data. Note that the detailed structure of the document feeder 120 will be described below with reference to FIGS. 2 to 5.

The image forming apparatus 100 includes an exposure unit 1, developing units 2, photosensitive drums 3, cleaners 4, chargers 5, an intermediate-transfer-belt unit 6, a fixing unit 7, a sheet feeder tray 81, a manual feed tray 82, an output tray 91, and a sheet path S. The image forming apparatus 100 forms a multicolor or monochrome image on a predetermined sheet in accordance with image data from an external device.

The image data processed by the image forming apparatus 100 corresponds to a color image in the colors of black (K), cyan (C), magenta (M), and yellow (Y). Hence, four image stations are provided to form four latent images in black, cyan, magenta, and yellow. The image stations for the respective colors each includes a developing unit 2, a photosensitive drum 3, a charger 5, and a cleaner 4.

The photosensitive drums 3 are disposed at the substantial center of the image forming apparatus 100. The chargers 5 uniformly charge the surfaces of the corresponding photosensitive drums 3 to a predetermined potential. The exposure unit 1 exposes the surfaces of the photosensitive drums 3 to form electrostatic latent images. The developing units 2 develop the corresponding electrostatic latent images on the surfaces of the corresponding photosensitive drums 3, and form toner images on the surfaces of photosensitive drums 3. Through the series of operations described above, toner images of the respective colors are formed on the surfaces of the photosensitive drums 3. The cleaners 4 remove and collect the toners remaining on the surfaces of the photosensitive drums 3 after development and image transfer.

An intermediate-transfer-belt unit 6 is disposed above the photosensitive drums 3, and includes an intermediate transfer belt 61, an intermediate-transfer-belt driving roller 62, an intermediate-transfer-belt driven roller 63, intermediate rollers 64, and an intermediate-transfer-belt cleaner 65. Four intermediate transfer rollers 64 are provided for the image stations of the respective YMCK colors.

The intermediate transfer belt 61 is extended across the intermediate-transfer-belt driving roller 62, the intermediate-transfer-belt driven roller 63, and the intermediate transfer rollers 64, such that the surface of intermediate transfer belt 61 is moved in a predetermined direction (direction of arrow D in the drawing) by the rollers.

While the intermediate transfer belt 61 moves in the direction of arrow D, the intermediate-transfer-belt cleaner 65 removes and collects the residual toners, and the toner images of the respective colors on the surfaces of the photosensitive drums 3 are sequentially transferred and overlaid with each other on the surface of the intermediate transfer belt 61 so as to form a color toner image on the surface of the intermediate transfer belt 61.

The image forming apparatus 100 further includes a secondary transfer unit 10 including a transfer roller 10a. A nip is defined between the transfer roller 10a and the intermediate transfer belt 61. A sheet transported through the sheet path S is fed through the nip. When the sheet passes through the nip, the color toner image on the surface of the intermediate transfer belt 61 is transferred onto the sheet.

The sheet feeder tray 81 stores sheets to be used for image formation, and is disposed below the exposure unit 1. The manual feed tray 82 is disposed on a side face of the image forming apparatus 100 so as to be freely opened and closed. When the manual feed tray 82 is opened, sheets to be used for image formation can be placed in the manual feed tray 82. The output tray 91 is disposed in the upper side of the image forming apparatus 100, and receives the sheets on which images have been formed.

The sheet path S includes an S-shaped main path S1, and a reverse path S2 that branches from the main path S1 and rejoins the main path S1. A pickup roller 11a, a manual-feed pickup roller 11b, pre-registration rollers 12a, registration rollers 13, the secondary transfer unit 10, the fixing unit 7, and output rollers 12b are disposed along the main path S1. The reverse path S2 branches from the main path S1 between the fixing unit 7 and the output rollers 12b, passes through reverse rollers 12c and 12d, and rejoins the main path S1 between the pre-registration roller 12a and the registration rollers 13.

The pickup roller 11a is a lead-in roller that is disposed near the end of the sheet feeder tray 81, and feeds each sheet in the sheet feeder tray 81 to the sheet path S. The registration rollers 13 temporarily hold the sheet transported from the sheet feeder tray 81, and feeds the sheet to the transfer roller 10a at a timing that aligns the front edge of the sheet and the front edge of the toner image on the intermediate transfer belt 61. The pre-registration rollers 12a are small rollers that support the transportation of the sheet.

The fixing unit 7 includes a fixing roller 71, a pressing roller 72 that presses the fixing roller, and a heater 73 that heats the fixing roller 71. The fixing unit 7 receives the sheet having the unfixed toner image. The sheet is transported between the fixing roller 71 and the pressing roller 72 for fixing. The sheet having the fixed toner image is outputted by the output rollers 12b onto the output tray 91.

When an image is also to be formed on the back face of the sheet, the output rollers 12b send the sheet in the opposite direction into the reverse path S2, where the sheet is flipped over. The flipped sheet is resent to the registration rollers 13. An image is formed on the back face of the sheet in the same manner as that formed on the front face. The sheet is then output to the output tray 91.

Figure 2:
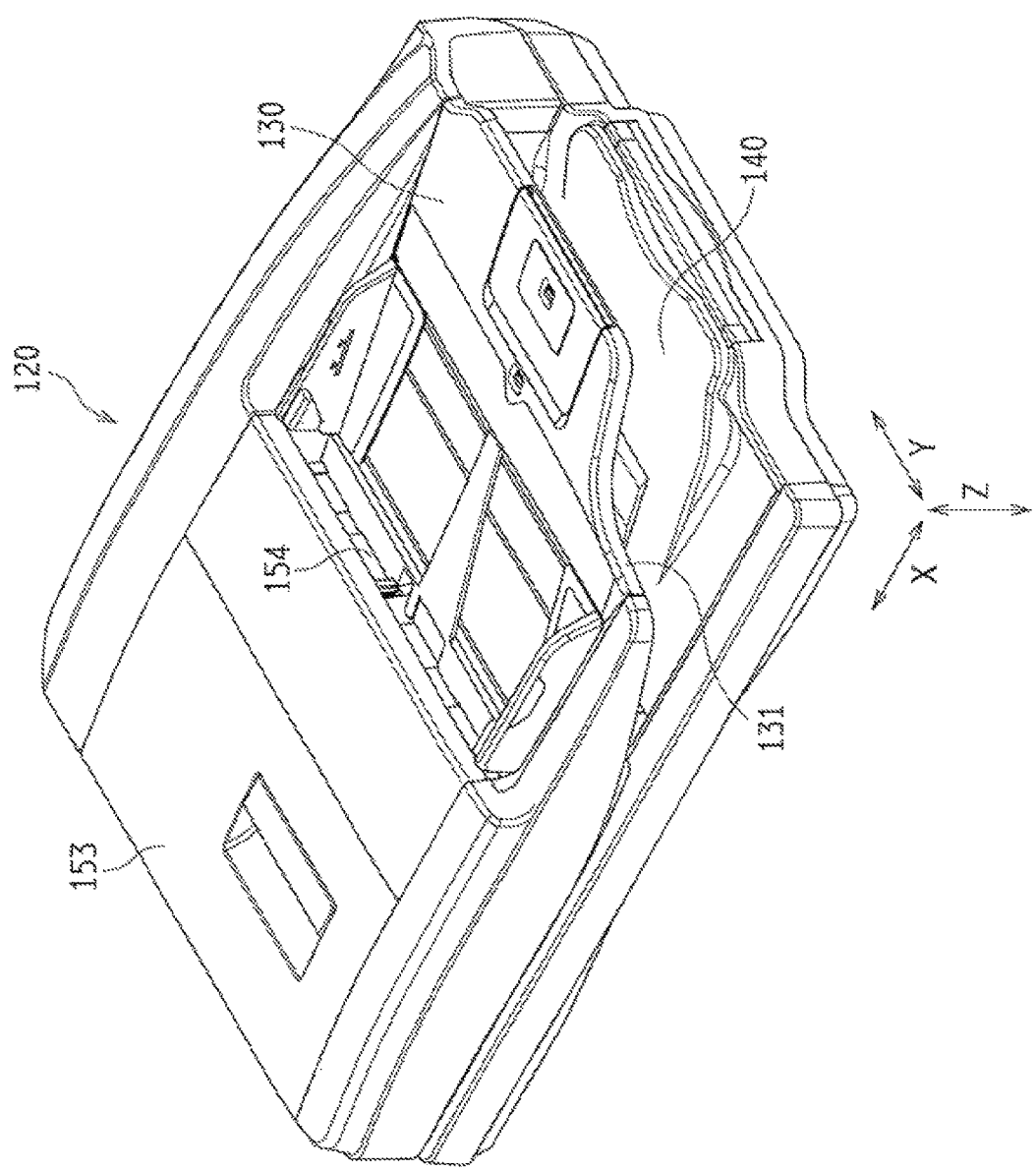
FIG. 2 is a perspective view of a document feeder according to the first embodiment of the present invention.
Figure 3:
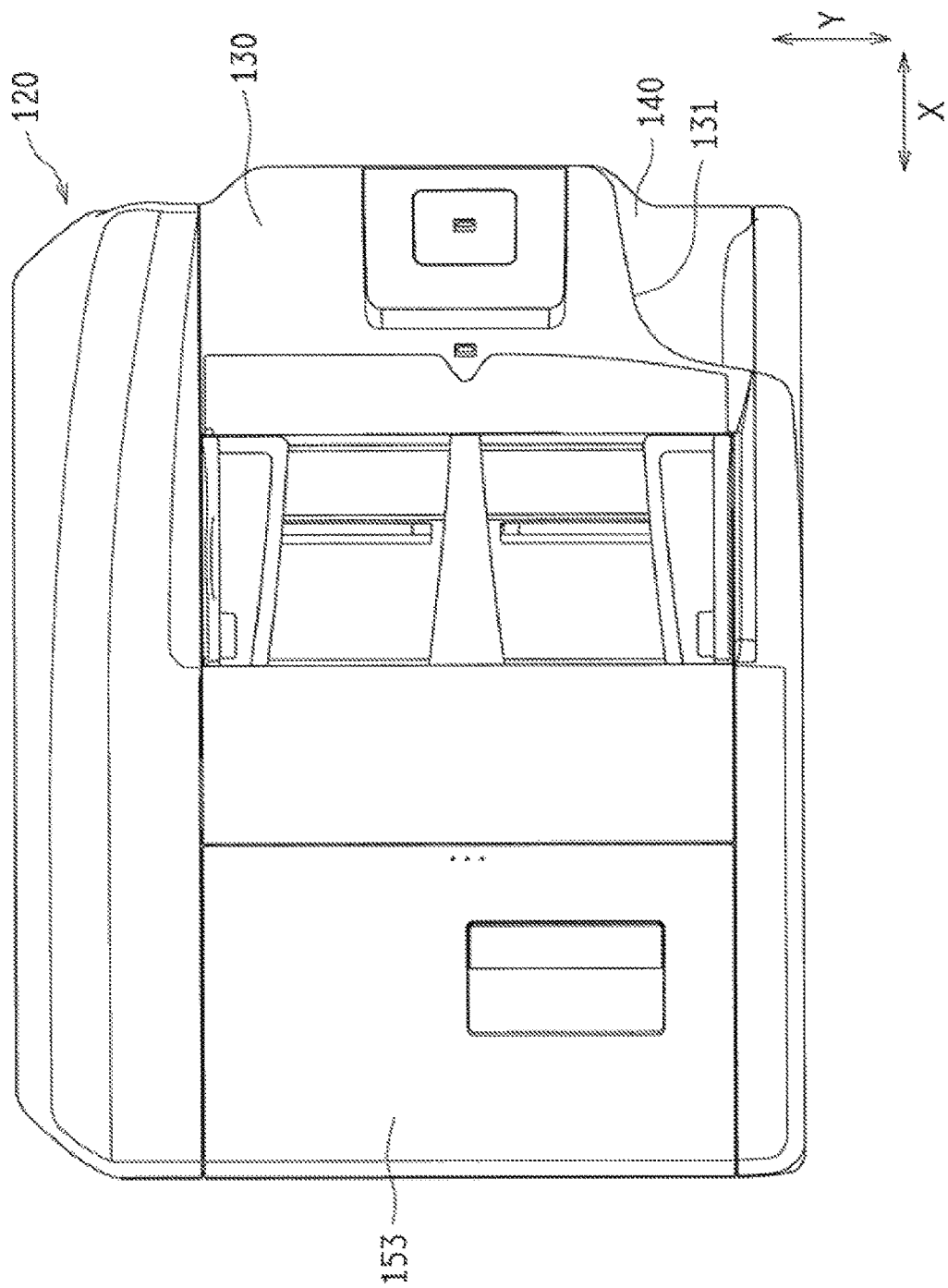
FIG. 3 is a top view of the document feeder illustrated in FIG. 2.
Figure 4:
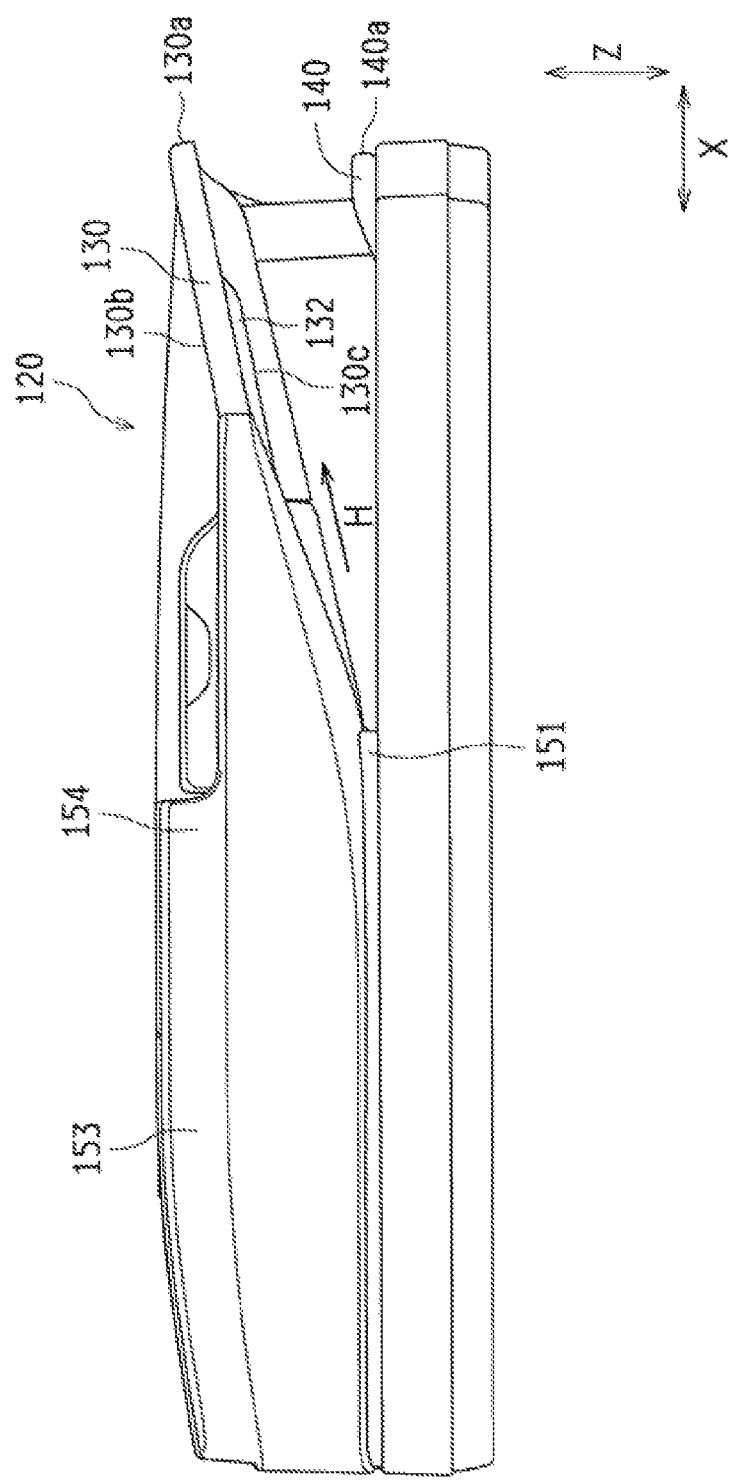
FIG. 4 is a front view of the document feeder illustrated in FIG. 2.
Figure 5:
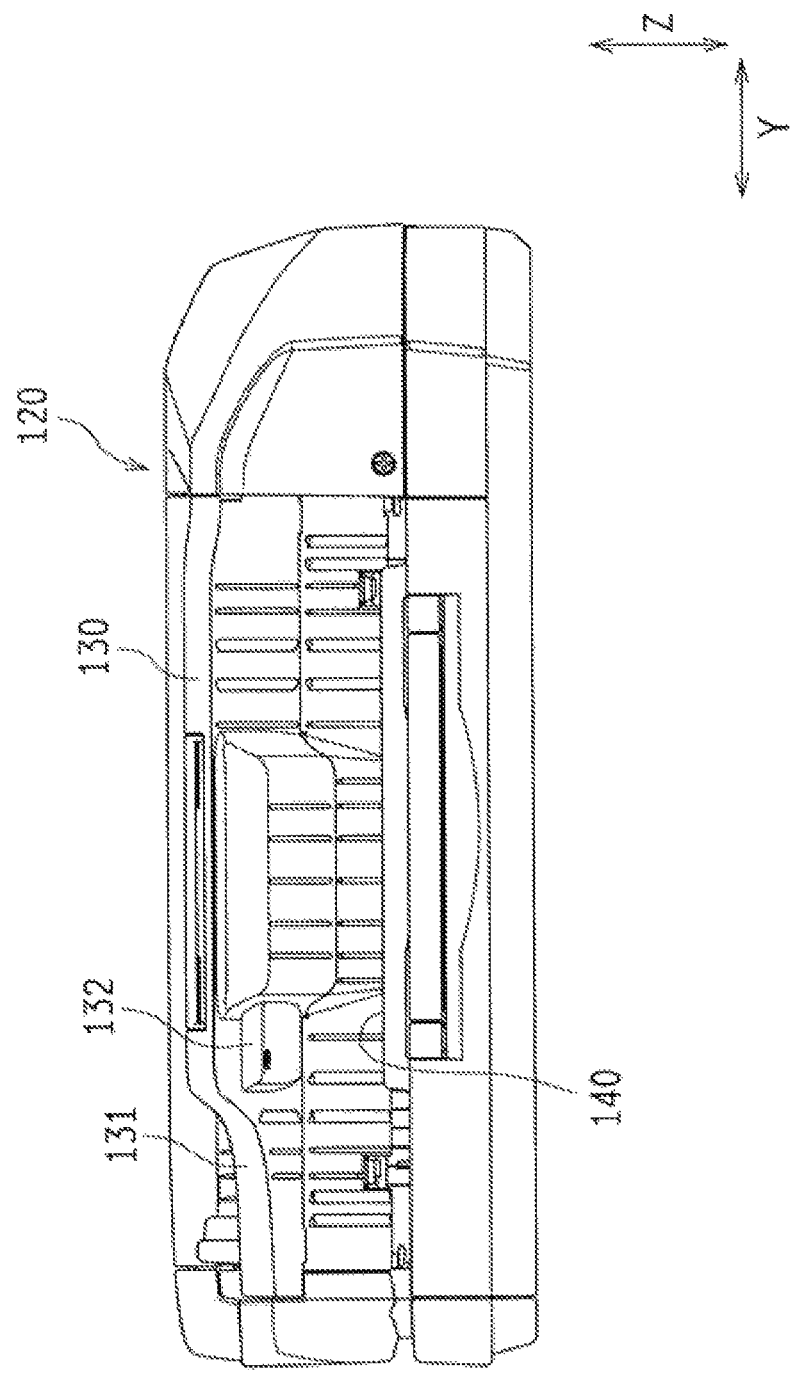
FIG. 5 is a side view of the document feeder illustrated in FIG. 2.

FIG. 2 is a perspective view of the document feeder 120 according to the first embodiment. FIG. 3 is a top view of the document feeder 120 illustrated in FIG. 2. FIG. 4 is a front view of the document feeder 120 illustrated in FIG. 2. FIG. 5 is a side view of the document feeder 120 illustrated in FIG. 2.

The document feeder 120 according to the first embodiment of the present invention includes an input tray 130b (which is an example of a document placing portion 130) on which a document is placed, and an output tray 140 (which is an example of a document discharge portion) on which the document output from a document output port 151 in an output direction H is stacked.

In the document feeder 120, a transporter 153 is disposed at one end (the left end in FIG. 3) in a length direction X (the left-right direction in FIG. 3) along the front side of the document feeder 120, and the input tray 130b and the output tray 140 are disposed on the other end (the right end in FIG. 3). A document placing portion 130 and the output tray 140 are disposed adjacent to each other along the height direction Z. The document placing portion 130 is disposed on the upper side, and the output tray 140 is disposed on the lower side. That is, the input tray 130b extends from a document input port 154 disposed in the upper portion of the transporter 153 to the other end of the document feeder 120. The output tray 140 extends from the document output port 151 disposed in the lower portion of the transporter 153 to the other end of the document feeder 120. Hence, the input direction (the leftward direction in FIG. 3) of the document transported from the input tray 130b is opposite to the output direction H (the rightward direction in FIG. 3) of the document transported to the output tray 140. In other words, the output direction H is one of the directions along the front side of the document feeder 120.

In the document feeder 120, a document placed on the input tray 130b enters the transporter 153 through the document input port 154. The document in the transporter 153 is read by the image reader 90, and outputted from the transporter 153 through the output rollers 152 provided in document output port 151 onto the output tray 140. In the description below, the direction orthogonal to the length direction X may also be referred to as "width direction Y" (the vertical direction in FIG. 3).

The input tray 130b is obliquely disposed such that the end adjacent to the document input port 154 is lower than the end (input-tray extension end 130a) remote from the document input port 154. That is, the input tray 130b is obliquely disposed so as to allow a document placed on the input tray 130b to slide into the document input port 154 by its own weight.

The output tray 140 is also obliquely disposed like the input tray 130b such that the end (output-tray extension end 140a) remote from the document output port 151 is disposed higher. When a document is outputted from the document output port 151, the document is slightly accelerated in the output direction H by the output rollers 152. The accelerated document is prevented from falling out of the output tray 140 by causing the document to slide back toward the document output port 151. By sliding back, documents are aligned on the output tray 140. Note that the input tray 130b and the output tray 140 may have different tilt angles.

The document placing portion 130 has a cutout portion 131 on the downstream side in the output direction H (the right side in FIG. 3) and the front side of the document feeder 120 in the width direction Y (the lower side in FIG. 3). The document placing portion 130 overlaps the output tray 140 in planar view (for example, in FIG. 3) such that the output tray 140 is exposed through the cutout portion 131. Note that in the description below, the front side of the document feeder 120 (the image forming apparatus 100) may also be referred to as "forward side" in the width direction Y, and the rear side of the document feeder 120 as "rearward side" (the top side in FIG. 3).

It is presumed that the image forming apparatus 100 is normally operated by a standing user facing the front side of the image forming apparatus 100. Thus, the operation panel, etc., are disposed on the front side. The image forming apparatus 100 is designed to facilitate manual removal of documents and sheets from the front side.

The document placing portion 130 includes the input tray 130b on the upper face, and a lower cover 130c that covers the lower portion of the input tray 130b. The lower face of the lower cover 130c has a light-source housing 132 near the cutout portion 131. The light-source housing 132 is disposed near the outer rim of the lower cover 130c along the cutout portion 131 on the slightly rearward side of the cutout portion 131. The structure of the light-source housing 132 and its vicinity will be described with reference to FIG. 6.

Figure 6:
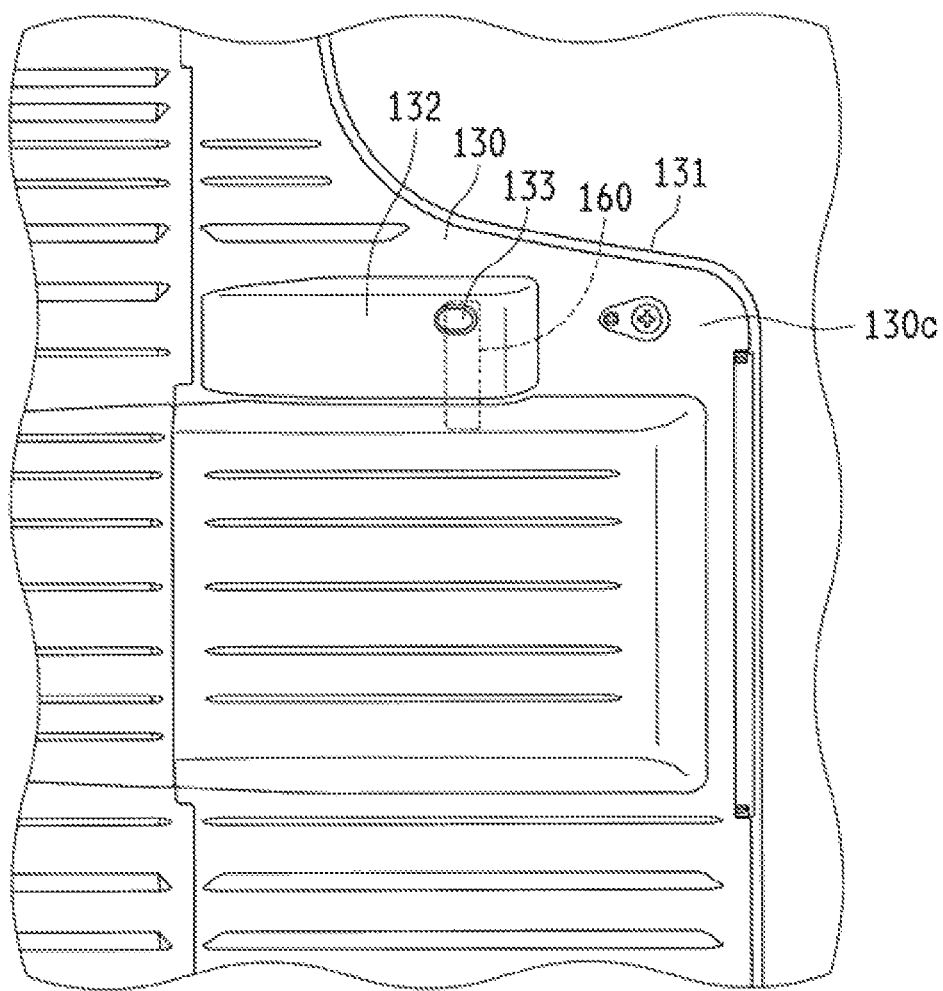
FIG. 6 is an enlarged bottom view of a light-source housing and its vicinity.

FIG. 6 is an enlarged bottom view of the light-source housing and its vicinity.

FIG. 6 illustrates the lower cover 130c (the document placing portion 130) illustrated in FIG. 2, etc., in a bottom view. FIG. 6 is an enlarged view of the light-source housing 132 and its vicinity. A substrate 160 including a light source 161 (see FIG. 7) is disposed inside the document placing portion 130 so as to face the light-source housing 132. The light-source housing 132 of the lower cover 130c has an opening portion 133 through which a portion of the substrate 160 is exposed. The substrate 160 includes a light emitting element (light source 161), such as a light-emitting diode (LED). The light from the light source 161 passes through the opening portion 133.

The relation between the structure of the substrate 160 and its vicinity and the irradiation range of light will now be described in detail with reference to FIGS. 7 and 8.

Figure 7:
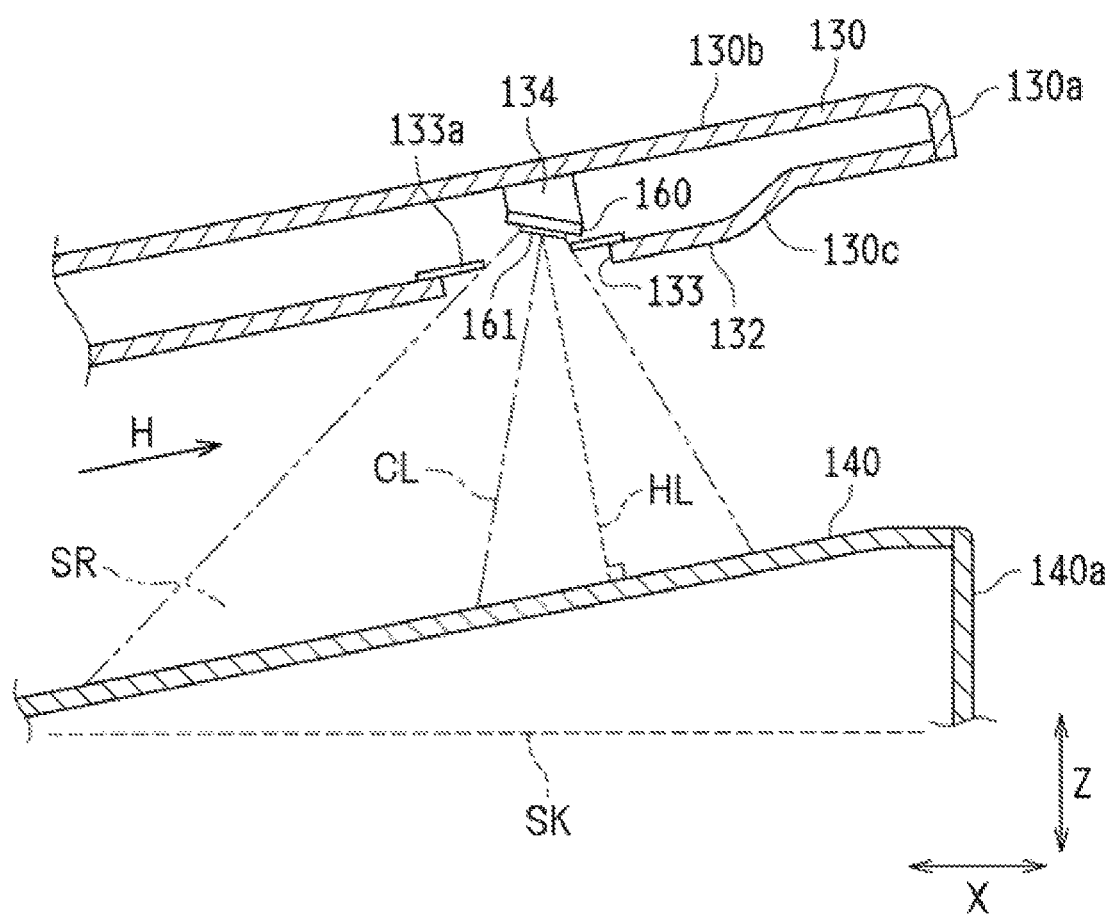
FIG. 7 is a schematic cross-sectional view of the structure of a substrate and its vicinity.

FIG. 7 is a schematic cross-sectional view of the structure of the substrate 16 and its vicinity. FIG. 8 is an enlarged cross-sectional view of a lower substrate holder 135 and its vicinity.

FIG. 7 illustrates a cross-sectional view of the substrate 160 and portions of the document placing portion 130 and the output tray 140 surrounding the substrate 160. Other portions of the document feeder 120 are not illustrated. A horizontal reference is defined for the document feeder 120. In FIG. 7, the horizontal reference corresponds to a plane that has a constant height in the height direction Z and is parallel to the length direction X. The horizontal reference line SK in FIG. 7 represents the horizontal reference. In this embodiment, the horizontal reference is a plane parallel to the length direction X and the width direction Y and orthogonal to the height direction Z.

As described above, the input tray 130b is obliquely disposed such that the input-tray extension end 130a is high. The upper and lower faces of the input tray 130b have substantially the same tilt angle. The upper face of the output tray 140 is also obliquely disposed such that an output-tray extension end 140a is high. That is, the placing face (on which a document is placed) of the input tray 130b and the upper face of the output tray 140 tilt relative to the horizontal reference of the document feeder 120.

The substrate 160 has a flat shape and is stored inside the document placing portion 130. The substrate 160 is held by an upper substrate holder 134 extending from the inner face of the input tray 130b. The substrate 160 may be held by, for example, a screw or a hook provided in the upper substrate holder 134. The portion of the upper substrate holder 134 abutting the substrate 160 tilts by an angle different from that of the placing face of the input tray 130b. The tilt angle of the optical axis (for example, the irradiation line CL) of the light emitted from the light source 161 on the substrate 160 corresponds to the tilt angle of the upper substrate holder 134.

Figure 8:
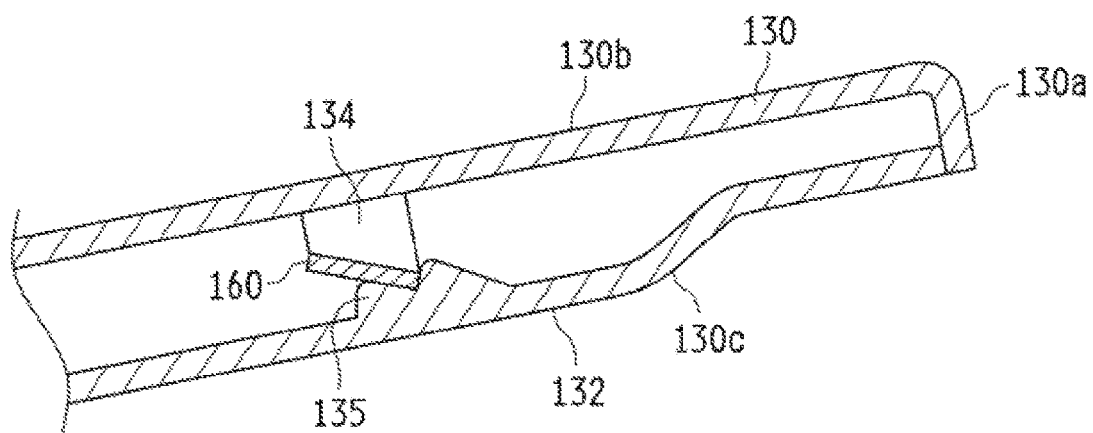
FIG. 8 is an enlarged cross-sectional view of a portion corresponding to a lower substrate holder.

The lower cover 130c has a lower substrate holder 135 that extends from the inner face of the lower cover 130c, as illustrated in FIG. 8. The lower substrate holder 135 is disposed slightly remote from the opening portion 133 and tilts by an angle different from the tilt angle of the placing face of the input tray 130b. The lower substrate holder 135 has a tilt angle that is the same as the tilt angle of the upper substrate holder 134, and holds the substrate 160 at an angle corresponding to the tilt angle of the lower substrate holder 135.

The substrate 160 may be held on the lower substrate holder 135 by a screw. In such a case, the upper substrate holder 134 may be omitted. In place of a screw, the substrate 160 may be held by a hook (engaging unit) (not illustrated) on the lower substrate holder 135. In such a case, the upper substrate holder 134 may press down on the substrate 160.

To fix a flat plate on a flat surface, it is usual to fix the flat plate along the flat surface. However, in this embodiment, the upper substrate holder 134 and the lower substrate holder 135 are provided to obliquely dispose the substrate 160. Thus, the substrate 160 can be disposed at any angle, regardless of the shape of the document placing portion 130.

In specific, the optical axis of the light source 161 tilts toward the document output port 151 (toward the left in FIG. 7). The dashed line HL in FIG. 7 extends perpendicularly from the upper face of the output tray 140 to the light source 161. The dashed-dotted line (irradiation line CL) extends perpendicularly from the light source 161 to the upper face of the output tray 140.

A thin slit member 133a is fixed to the inner face of the opening portion 133 adjacent to the substrate 160. The slit member 133a has a light shielding property and blocks a portion of the light emitted from the light source 161 to restrict the amount of the light passing through. In other words, the irradiation range SR can be freely adjusted in accordance with the shape of the slit member 133a. The dash-double dot lines in FIG. 7 define the range (irradiation range SR) on the output tray 140 irradiated with light passing through the opening portion 133 and the slit member 133a.

The tilt of the substrate 160 and the variation in the irradiation range SR will now be described with reference to FIG. 9.

Figure 9:
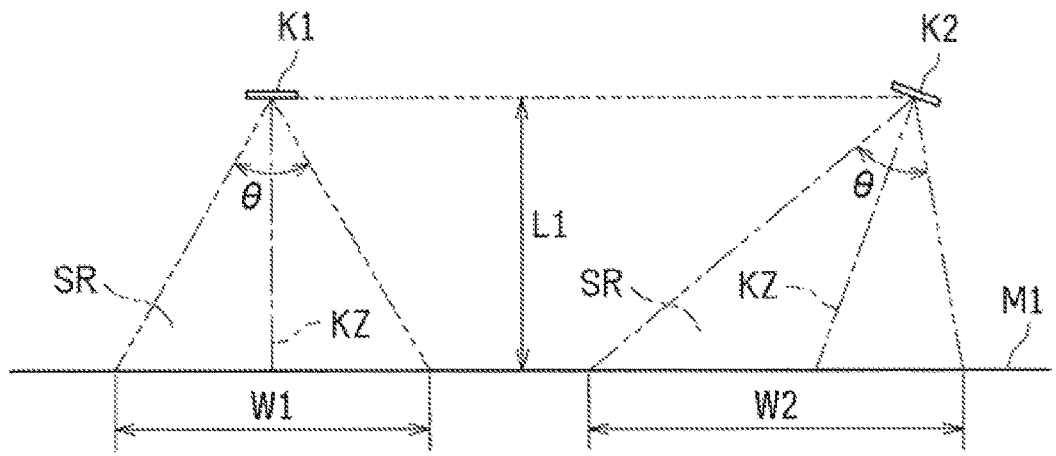
FIG. 9 illustrates the relation between the direction of a light source and an irradiation range.

FIG. 9 illustrates the relation between the direction of a light source and an irradiation range.

FIG. 9 illustrates two irradiation ranges SR of two light sources (first light source K1 and second light source K2) disposed at the same distance (light-source distance L1), in relation to the reference plane M1 irradiated with light. In specific, the first light source K1 and the second light source K2 have the same specifications, and radiate light at the same light-spreading angle (irradiation angle θ) relative to the optical axis KZ. The first light source K1 faces the reference plane M1, and the optical axis KZ is orthogonal to the reference plane M1. The second light source K2 is obliquely disposed relative to the reference plane M1, and the optical axis KZ is not orthogonal to the reference plane M1. As a result, the width of the area of the reference plane M1 irradiated with light from the second light source K2 (second irradiation width W2) is larger than the width of the area of the reference plane M1 irradiated with light from the first light source K1 (first irradiation width W1). In this way, the area of the irradiation range SR varies depending on the tilt angle of the light source.

In this embodiment as described above, the light source 161 and the upper face of the output tray 140 are not disposed parallel to each other. Thus, the irradiation line CL and the line HL do not align with each other. The substrate 160 is obliquely disposed relative to the horizontal reference of the document feeder 120 at a tilt angle different from the tilt angle of the placing face of the input tray 130b. By obliquely disposing the substrate 160 relative to the horizontal reference, the area of the irradiation range SR increases in the output direction H, thereby providing the user with a better view. Since the substrate 160 is obliquely disposed relative to the output tray 140, the area of the irradiation range on the output tray 140 is increased. In specific, the area of the irradiation range SR on the upper face of the output tray 140 is particularly increased on the side on which the light source 161 is tilted. That is, the area of the irradiation range SR can be increased in any desired direction.

As illustrated in FIG. 7, the substrate 160 is disposed near the downstream edge (input-tray extension end 130a) of the document placing portion 130 in the output direction H. Thus, the leading edge of a document on the output tray 140 in the output direction H is included in the irradiation range, and the visibility of the document can be enhanced by the contrast in light caused by the document. In other words, the length of the output tray 140 in the output direction H is designed in accordance with the size of the documents to be stacked on the output tray 140, and is determined to be long enough to fit the edges of the documents. Thus, when the document are stacked on the output tray 140, the edges of the documents are disposed near the output-tray extension end 140a. When both the documents and the output tray 140 are illuminated with light, the light reflect differently at the document and the output tray 140, causing a difference in brightness of the documents and the output tray 140.

In this embodiment, the output tray 140 extends to an area downstream of the irradiation range SR in the output direction H. In other words, the output tray 140 has an illuminated portion and an unilluminated portion. The contrast between these portions causes the light to be noticeable by the user.

Note that the irradiation range SR may be appropriately varied depending on the tilt of the substrate 160 and the position of the substrate 160 on the document placing portion 130. For example, the external side of the output-tray extension end 140a in the output direction H may be illuminated.

In this embodiment, the substrate 160 is obliquely disposed to adjust the tilt angle of the optical axis of the light source 161. Alternatively, an optical member may be disposed to vary the tilt angle of the optical axis of the light source 161. The optical member is, for example, a prism or a lens, and is able to tilt the light emission direction.

The output tray 140 may include an auxiliary tray that can be pulled out in the downstream direction from the output-tray extension end 140a so as to increase the area on which documents are stacked. In such a case, the auxiliary tray does not have to be emitted, and the irradiation range SR may not include the auxiliary tray.

Second Embodiment

An image forming apparatus (document feeder) according to a second embodiments of the present invention will now be described with reference to the accompanying drawings. The structure of the image forming apparatus according to the second embodiment is substantially the same as that of the first embodiment. Thus, the same reference numerals are used and redundant descriptions and drawings are omitted.

Figure 10:
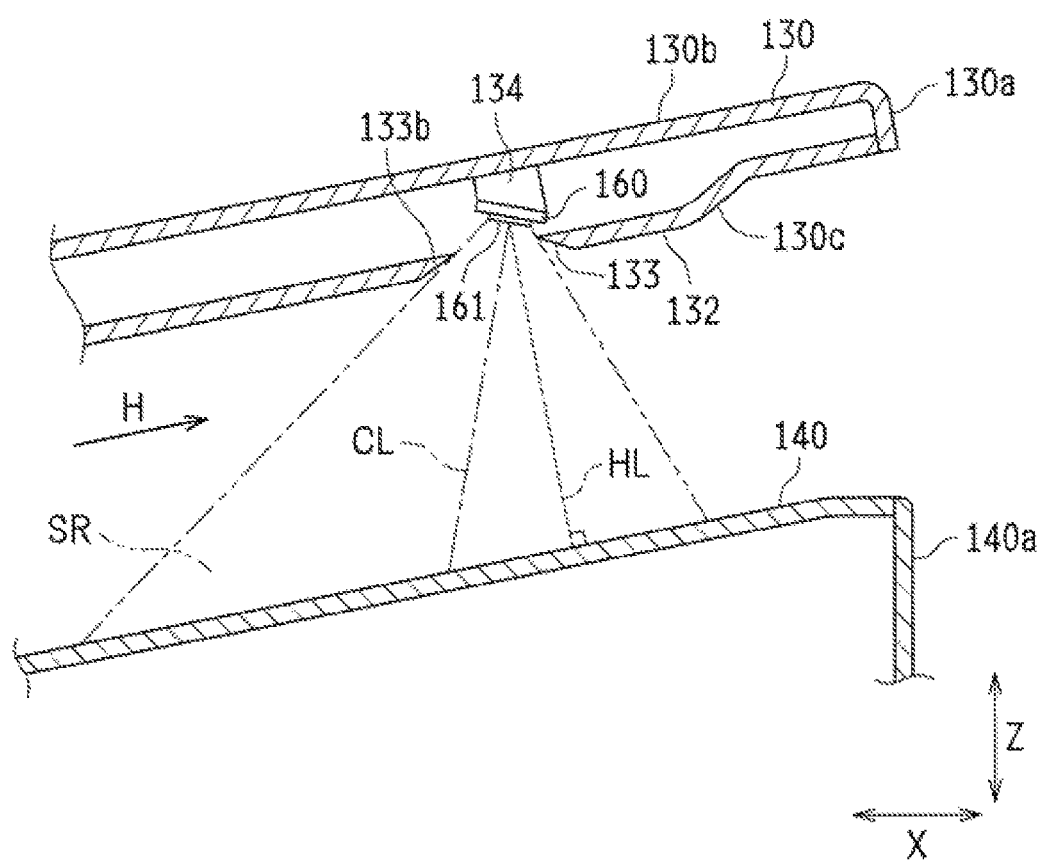
FIG. 10 is a schematic cross-sectional view of the structure of a substrate and its vicinity according to a second embodiment of the present invention.

FIG. 10 is a schematic cross-sectional view of the structure of a substrate and its vicinity according to the second embodiment of the present invention.

The structure of the opening portion 133 and its vicinity in the second embodiment differs from that in the first embodiment. In specific, the opening portion 133 has a taper 133b having a gradually varying thickness. The taper 133b is obliquely disposed such that the opening is small in the inner face and large in outer face. In the case where the opening portion 133 has the taper 133b, the slit member 133a may be omitted. That is, the area of the irradiation range SR is reduced by the shape of the opening portion 133. At this time, if the thickness of the casing of the document placing portion 130 is large, the area of the irradiation range SR may not be reduced as intended. In order to avoid such an error due to a large thickness, it is desirable to provide a thin edge on the opening portion 133.

Third Embodiment

An image forming apparatus (document feeder) according to a third embodiments of the present invention will now be described with reference to the accompanying drawings. The structure of the image forming apparatus according to the third embodiment is substantially the same as that of the first and second embodiments. Thus, the same reference numerals are used and redundant description and drawings are omitted.

In the first embodiment, the optical axis of the light source 161 tilts with respect to the output direction H. In the third embodiment, the optical axis of the light source 161 also tilts relative to the width direction Y. In specific, the optical axis of the light source 161 tilts toward the front side in the width direction Y. Such a configuration can increase the area of the irradiation range SR toward the front side, thereby illuminating the area close to the user. Thus, the light is made noticeable to the user.

Note that the embodiments disclosed herein are illustrative in all respects and do not serve as a basis for limited interpretation. Therefore, the technical scope of the invention should not be interpreted only by the above-described embodiments, but should be defined based on the description of the scope of claims. Meanings equivalent to the claims and all modifications within the scope are included in the technical scope of the invention.

What is claimed is:

1. A document feeder comprising:
    a document placing portion on which a document is placed;
    a transporter which transports the document placed on the document placing portion so as to output the document from a document output port in an output direction;
    a document discharge portion on which the document output from the document output port is stacked; and
    a substrate including a light source that emits light with which the document discharge portion is irradiated,
    the document discharge portion being disposed below the document placing portion,
    the substrate being fixed to the document placing portion so as to incline relative to a horizontal reference of the document feeder, and inclining a surface of the substrate on which the light source is mounted such that an optical axis of the light source extends toward the document output port.

2. The document feeder according to claim 1, wherein the optical axis of the light source tilts in the output direction relative to an upper face of the document discharge portion.

3. The document feeder according to claim 1, wherein the optical axis of the light source tilts in the output direction relative to a placing face of the document placing portion.

4. The document feeder according to claim 1, wherein the substrate is disposed on a downstream edge of the document placing portion in the output direction.

5. The document feeder according to claim 4, wherein an irradiation range of light emitted from the light source includes an area out of a downstream edge of the document discharge portion in the output direction.

6. The document feeder according to claim 4, wherein the document discharge portion extends in the output direction to an area downstream of an irradiation range of the light emitted from the light source.

7. The document feeder according to claim 1, wherein,
    the substrate is incorporated in the document placing portion and allows emission of light through an opening portion, and
    the opening portion is disposed on a lower face of the document placing portion, and comprises a slit member that restricts light emitted from the light source.

8. The document feeder according to claim 1, wherein the optical axis of the light source tilts toward a front side of the document feeder in a width direction of the document output from the document output port.

9. An image forming apparatus comprising the document feeder according to claim 1.

* * * * *